H. M. ROCKWELL.
ANTIFRICTION BEARING.
APPLICATION FILED MAR. 12, 1910.

1,193,071.

Patented Aug. 1, 1916.

WITNESSES:
F. E. Potter.

INVENTOR:
Hugh M. Rockwell,
BY
his ATTORNEY.

UNITED STATES PATENT OFFICE.

HUGH M. ROCKWELL, OF BRISTOL, CONNECTICUT, ASSIGNOR, BY MESNE ASSIGNMENTS, TO THE NEW DEPARTURE MANUFACTURING COMPANY, OF BRISTOL, CONNECTICUT, A CORPORATION OF CONNECTICUT.

ANTIFRICTION-BEARING.

1,193,071.  Specification of Letters Patent.  Patented Aug. 1, 1916.

Application filed March 12, 1910. Serial No. 548,899.

*To all whom it may concern:*

Be it known that I, HUGH M. ROCKWELL, a citizen of the United States, residing at Bristol, county of Hartford, State of Connecticut, have invented a certain new and useful Antifriction-Bearing, of which the following is a full, clear, and exact description, such as will enable others skilled in the art to which it appertains to make and use the same, reference being had to the accompanying drawings, forming part of this specification.

My invention relates to antifriction bearings, and is particularly applicable to double-row ball-bearings.

My object is to provide a bearing which has great accuracy in operation and can sustain thrusts as well as radial load, the parts of the bearing being securely held against lateral play or displacement.

A further object is to provide a bearing of the character indicated which consists of but few parts and can be readily manufactured and assembled.

To these ends, and also to improve generally upon devices of the character indicated, my invention consists in the various matters hereinafter described and claimed.

Figure 1:
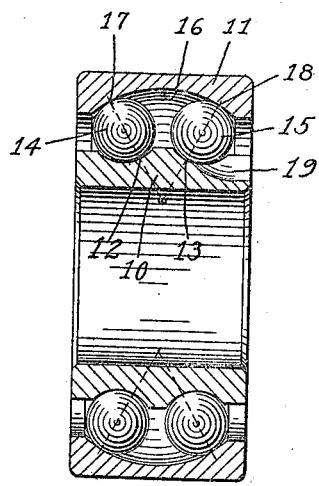
Figure 2:
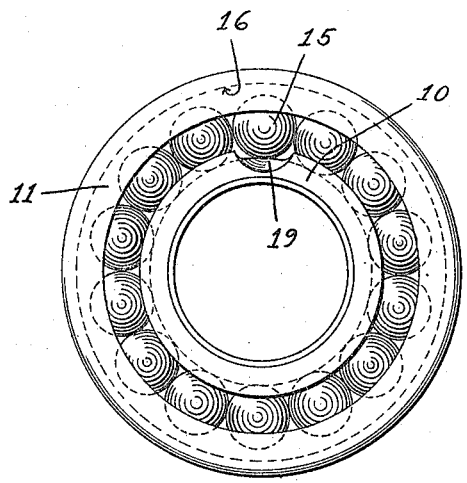

In the accompanying drawings, Figure 1 is a transverse sectional elevation; Fig. 2 is a side elevation; and Fig. 3 is a sectional view illustrating a convenient manner of assembling the balls of one of the rows.

The bearing here shown embodies a cylindrical inner ring or bearing member 10 having parallel peripheral grooves or races 12 and 13, an outer bearing member or ring 11, and antifriction members or balls 14 and 15 received in said races 12 and 13 and bearing between said rings 10 and 11.

In double-row bearings it is highly advantageous that the races of the ring 11 be parallel with each other and also concentric with respect to each other, as this insures the true running of the balls, and it is also very important that the rings 10 and 11 have no relative lateral play or displacement, for any such play permits wabbling of the wheel or other device to which the bearing is applied and also causes pounding and undue wear upon the bearing. To obtain the desired concentricity and parallelism of the races of the said ring 11 and at the same time cause the parts to be securely held against lateral play, the inner surface 16 of the ring 11 is broad enough to be engaged by both rows of balls and is curved to define the arc of a circle whose center $o$ is eccentric to the center of the bearing. The balls, which can be conveniently inserted in a manner hereinafter described, lie in the grooves 12 and 13 and engage the portions of the surface 16 at appropriate points 17 and 18, such portions including such points thus being bearing surfaces for the balls. In a bearing constructed in this way, the races or lines in which the respective rows of balls track upon said ring 11, such respective lines including said points 17 and 18, are, manifestly, concentric and also parallel with respect to each other and the groove produced by the concave surface 16 can be readily ground in an integral ring, but the transverse curvature of the said surface 16 is not coincident with the circle whose circumference, struck from the center of the bearing, includes said points 17 and 18, and for this reason the ring 11 cannot rock laterally upon the ring 10 or have other lateral play with respect thereto. Therefore, by providing the ring 11 with a groove broad enough to receive both rows of balls and having the transverse line of its face forming the arc of a circle whose center is eccentric to the center of the bearing, I produce a bearing whose outer ring has its races or track-lines for the balls true with respect to each other and yet the parts of the assembled bearing are securely held against lateral play or displacement, the bearing thus avoiding wabbling and pounding and sustaining lateral thrusts as well as radial load.

Figure 3:
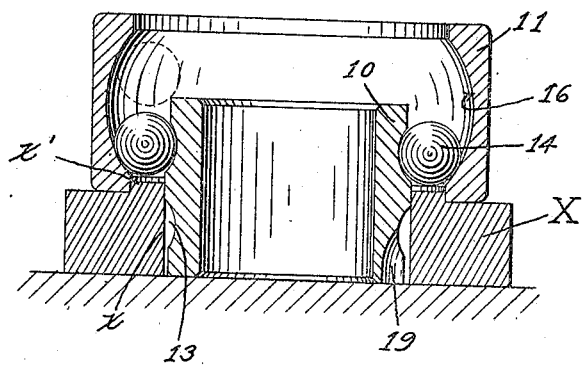

Preferably the outer diameter of the ring 10 and the inner diameter of the ring 11 are so proportioned that when said rings are displaced laterally, as indicated in Fig. 3, the distance between corresponding edges of said rings is greater than the diameter of the balls used in the bearing. The inwardly increasing space afforded by said groove produced by the concave surface 16 combines with this said space between the edges to afford a convenient manner of rapidly inserting one of the rows of balls. To best effect this I employ a block X whose central aperture $x$ receives the ring 10 while its body supports the ring 11 in the desired lateral displacement, the boss $x'$ received between the two rings serving to properly center said rings. The rings being displaced laterally, as shown, the balls can be inserted between the edges of the rings, as indicated by the dotted ball shown in Fig. 3, and will then roll into the groove 12, being guided by the curved surface 16, said surface also preventing the inserted balls from falling entirely through the ring 11. By then merely sliding the ring 10 into alinement with the ring 11 the said inserted row of balls seats against that race of the ring 11 which includes the point 17. The remaining row of balls, 15, can then be snapped into place through the filling groove 19, whereupon the parts of the bearing are securely locked together. This structure presents one row of balls, 14, in an absolutely unbroken race notwithstanding the fact that this row does its part in holding the rings against lateral displacement.

While I have illustrated a bearing of what is known as the full type, i. e., having balls completely filling the circular space, it is manifest that I can, if desired, employ a less number of balls in each row and use separators for spacing the balls, such separators employed in such way being well known. Thus the groove of the outer ring presents races so formed as to enable true running of the bearing and this groove also serves to securely hold the parts of the bearing against lateral play, the bearing sustaining thrusts as well as radial load. Furthermore, the parts can be readily made and assembled.

Having thus described my invention, what I claim as new and desire to secure by Letters Patent is:

A double-row antifriction bearing comprising a race-member, two rows of antifriction members seated thereon and held against lateral displacement with respect thereto, and a second race-member having its surface opposite said first race-member defining an arc which extends over both said rows of antifriction members and is eccentric to the axis of rotation of the bearing, whereby said arcuate surface prevents tilting of said race-members with respect to each other and affords race tracks which are parallel and concentric with each other; substantially as described.

In testimony whereof, I hereunto affix my signature, in the presence of two witnesses.

HUGH M. ROCKWELL.

Witnesses:
GEORGE L. SANFORD,
JOSEPH D. BROWN.